US012048309B2

(12) United States Patent
Gomelsky et al.

(10) Patent No.: US 12,048,309 B2
(45) Date of Patent: Jul. 30, 2024

(54) **MATERIALS AND METHODS FOR PREVENTING AND DISPERSING EXOPOLYSACCHARIDE-CONTAINING BIOFILMS INVOLVING *LISTERIA MONOCYTOGENES***

(71) Applicant: University of Wyoming, Laramie, WY (US)

(72) Inventors: Mark Gomelsky, Laramie, WY (US); Ahmed Elbakush, Tripoli (LY)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 17/878,517

(22) Filed: Aug. 1, 2022

(65) Prior Publication Data

US 2023/0049275 A1 Feb. 16, 2023

Related U.S. Application Data

(60) Provisional application No. 63/227,732, filed on Jul. 30, 2021.

(51) Int. Cl.
*A23B 7/16* (2006.01)
*A23B 7/154* (2006.01)
(Continued)

(52) U.S. Cl.
CPC ................ *A23B 7/16* (2013.01); *A23B 7/154* (2013.01); *A23L 3/3463* (2013.01); *A23L 3/3508* (2013.01)

(58) Field of Classification Search
CPC .. A23B 7/154; A23B 7/16; A23B 4/14; A23B 4/16; A23B 4/18; A23B 4/20; A23B 4/22; A23B 4/24; A23B 9/16; A23B 9/18; A23B 9/20; A23B 9/22; A23B 9/24; A23B 9/26; A23B 9/28; A23B 7/153;
(Continued)

(56) References Cited

U.S. PATENT DOCUMENTS 10,272,126 B2 4/2019 Duncan et al.
10,863,748 B2 * 12/2020 Luong .................... A61P 31/02
(Continued)

FOREIGN PATENT DOCUMENTS

WO WO-2016069888 A1 * 5/2016 ............ A01N 63/50

OTHER PUBLICATIONS

Veerachandra "Effect of pecan variety and the method of extraction on the antimicrobial activity of pecan shell extracts against different foodborne pathogens and their efficacy on food matrices", Food Control, 2020, 112, 107098, pp. 1-7 (Year: 2020).*

(Continued)

*Primary Examiner* — Changqing Li
(74) *Attorney, Agent, or Firm* — MacMillan, Sobanski & Todd, LLC

(57) ABSTRACT

Methods and compositions for inhibiting or dispersing biofilms produced by *Listeria monocytogenes* on plant matter are described. Embodiments include using formulations comprising active chemical constituents and aqueous extracts or sap from certain trees. Methods of using and producing aqueous formulations derived from hickory and maple wood are provided. Formulations and methods are provided for preventing and dispersing exopolysaccharide-rich listerial biofilms.

45 Claims, 6 Drawing Sheets
(4 of 6 Drawing Sheet(s) Filed in Color)

Figure 2A:
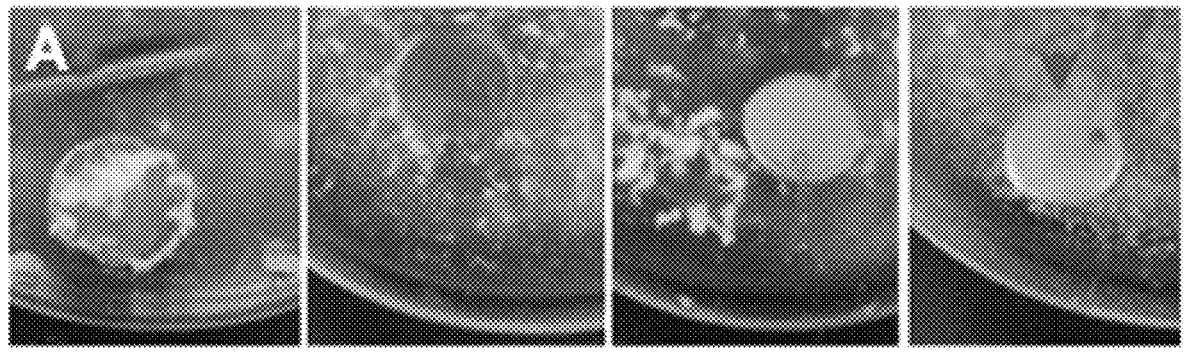
Figure 2B:
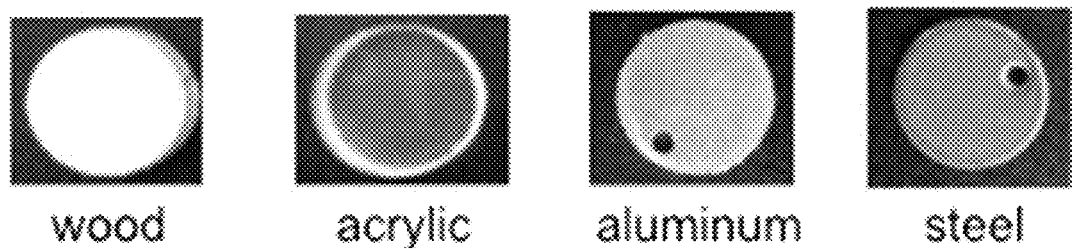
Figure 2C:
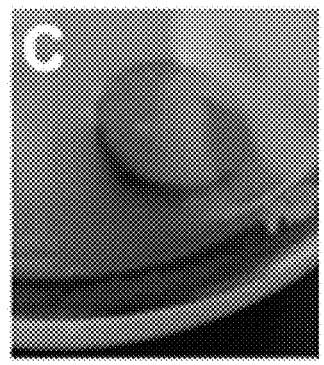
Figure 3A:
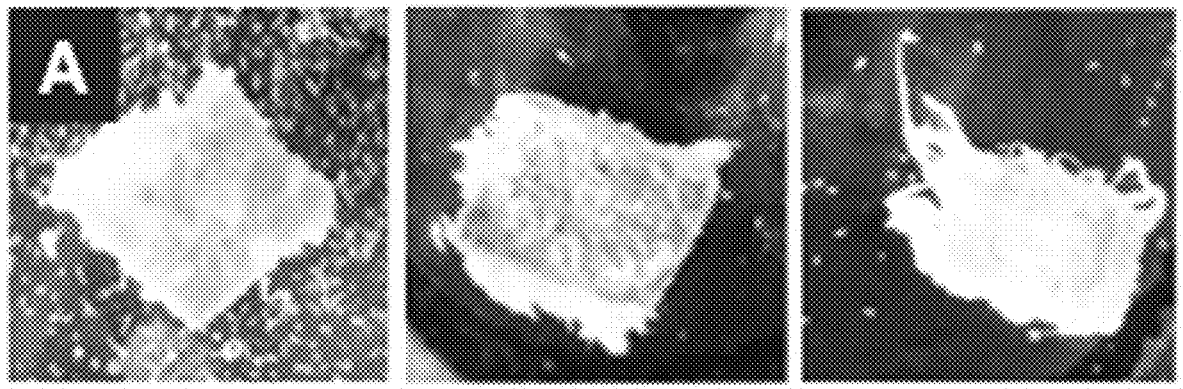
Figure 3B:
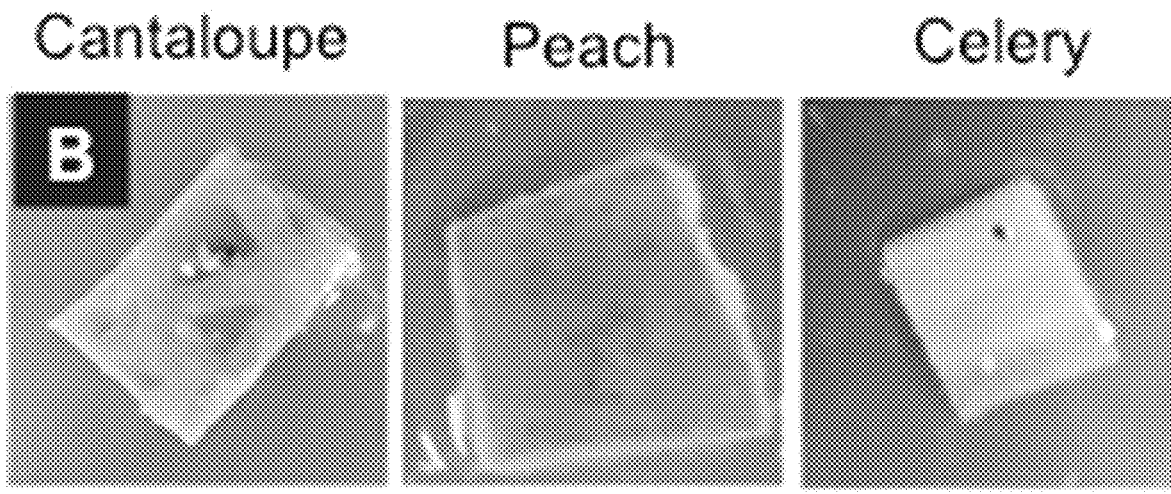
Figure 4:
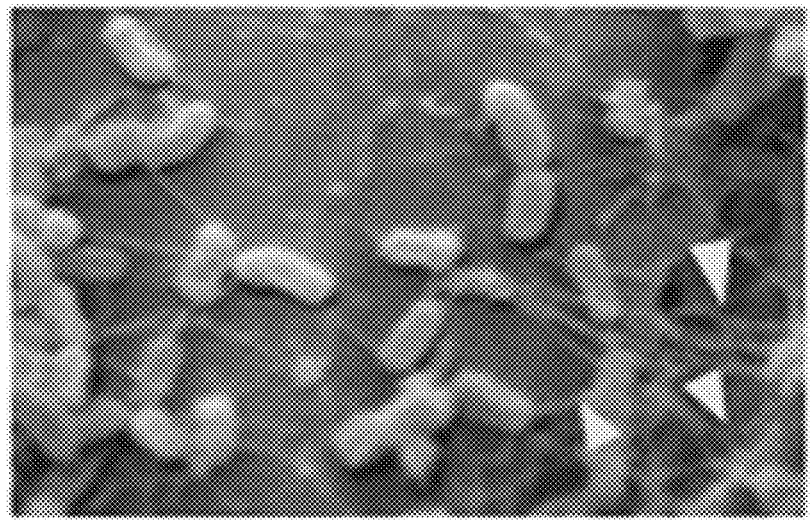
Figure 4:
Figure 5A:
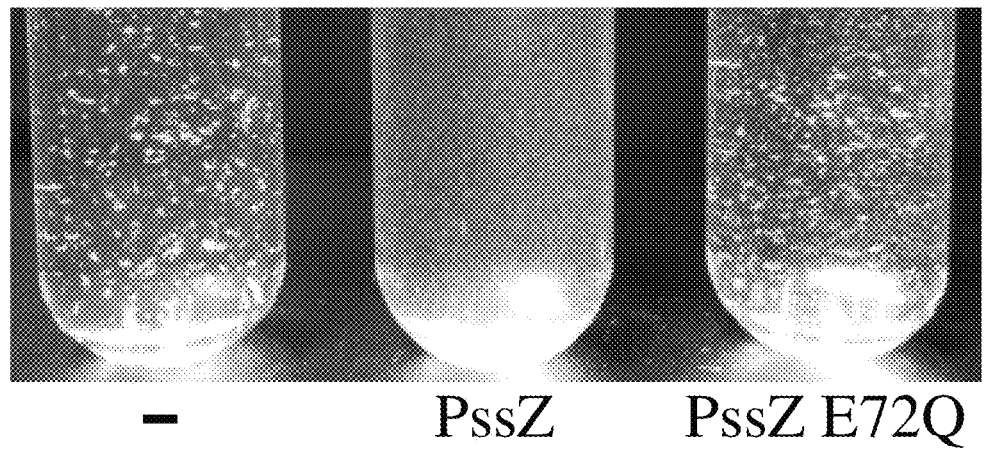
Figure 5B:
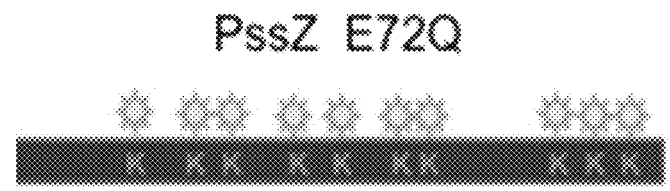
Figure 5C:
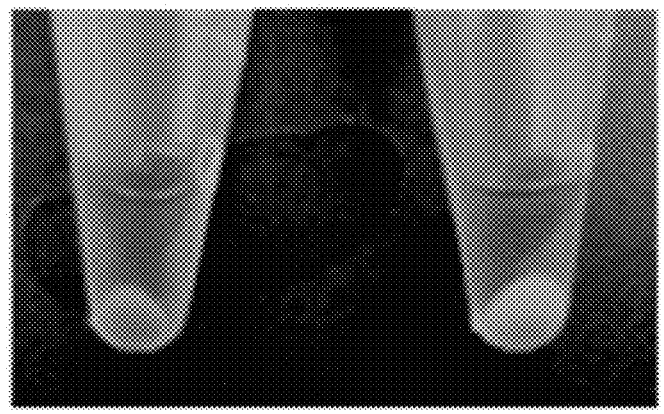
Figure 6:
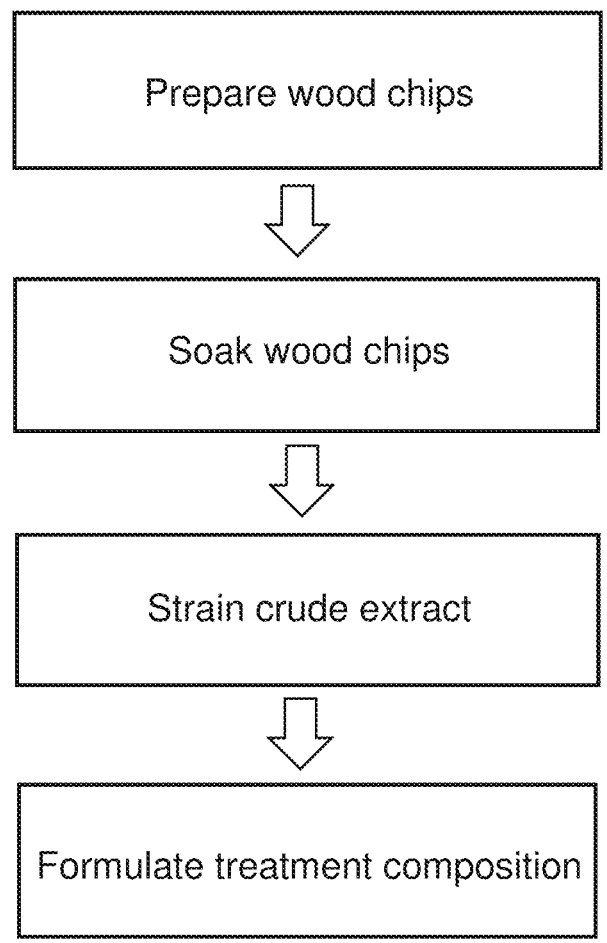

(51) Int. Cl.
*A23L 3/3463* (2006.01)
*A23L 3/3508* (2006.01)

(58) Field of Classification Search
CPC .......... A23B 7/155; A23B 7/157; A23B 5/08;
A23B 5/10; A23B 5/12; A23B 5/14;
A23B 5/16; A23B 5/18; A23L 3/3463;
A23L 3/3472; A23L 3/3562; A23L
3/3481; A23L 3/34; A23L 3/3454; A23L
3/34635; A23L 3/3571; A23L 3/358
See application file for complete search history.

(56) References Cited

U.S. PATENT DOCUMENTS

| 2013/0310332 | A1 | 11/2013 | Barbeau et al. |
| 2014/0343165 | A1 | 11/2014 | Stich et al. |
| 2016/0339071 | A1 | 11/2016 | Tufenkji et al. |

OTHER PUBLICATIONS

Maisuria, "Polyphenolic Extract from Maple Syrup Potentiates Antibiotic Susceptibility and Reduces Biofilm Formation of Pathogenic Bacteria", Applied and Environmental Microbiology, 2015, 81(11), pp. 3782-3792, (Year: 2015).*

Gray et al., "Novel Biocontrol Methods for Listeria monocytogenes Biofilms in Food Production Facilities", Frontiers in Microbioloby, 2018, vol. 9, Article 605, pp. 1-12.

Bouarab-Chibane et al., "Antibacterial Properties of Polyphenols: Characterization and QSAR (Quantitative Structure-Activity Relationship) Models", Frontiers in Microbiology, 2019, vol. 10, Article 829, pp. 1-23.

Fulano et al., "The Listeria monocytogenes exopolysaccharide significantly enhances colonization and survival on fresh produce", Frontiers in Microbiology, 2023, pp. 1-11.

Elbakush et al., "CodY-Mediated c-di-GMP-Dependent Inhibition of Mammalian Cell Invasion in Listeria monocytogenes", Journal of Bacteriology, 2018, Issue 5, pp. 1-12.

Galie et al., "Biofilms in the Food Industry: Health Aspects and Control Methods", Frontiers in Microbiology, 2018, vol. 9, Article 898, pp. 1-18.

Abedini et al., "Abundant Extractable Metabolites from Temperate Tree Barks: The Specific Antimicrobial Activity of Prunus Avium Extracts", MDPI Antibiotics, 2020, vol. 9, Issue 111, pp. 1-13.

Balta et al., "The effect of natural antimicrobials against *Camplyobacter* spp. and its similarities to *Salmonella* spp, *Listeria* spp., *Escherichia coli*, *Vibrio* spp., *Clostridium* spp. and *Staphlyococcus* spp", Elsevier, Food Control 121, 2020, pp. 1-11.

Yemmireddya et al., "Effect of pecan variety and the method of extraction on the antimicrobial activity of pecan shell extracts against different foodborne pathogens and their efficacy on food matrices", Food Control, 2020, vol. 112, pp. 1-20.

Gomelsky, M., Detection and Elimination of Listerial Exopolysaccharide, USDA Grant Application, Sep. 2018.

Aviat et al., "Microbial Safety of Wood in Contact with Food: A Review", Comprehensive Review in Food Science and Food Safety, 2016, vol. 15, pp. 491-505.

Segura et al., "Effect of Carya illinoinensis, Quercus rubra and Smilax glyciphylla extracts, pectin, and papain on the dental biofilm microorganisms", Journal of Pharmacy & Pharmacognosy Research, 2015, vol. 3, Issue 5, pp. 118-129.

Maisuria et al., "Polyphenolic Extract from Maple Syrup Potentiates Antibiotic Susceptibility and Reduces Biofilm Formation of Pathogenic Bacteria", Applied and Environmental Microbiology, 2015, vol. 81, No. 11, pp. 3782-3792.

Colagiorgi et al., "A Look inside the Listeria monocytogenes Biofilms Extracellular Matrix", MDPI Microorganisms, 2016, vol. 4, No. 22, pp. 1-12.

Gomelsky, M., Listeria—Plant Biofilms, USDA Grant Application, Aug. 2020.

* cited by examiner

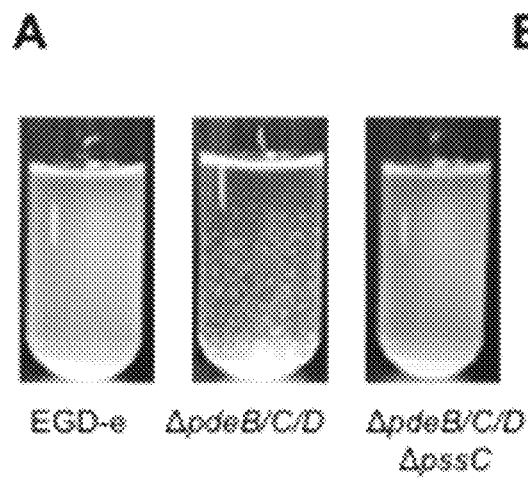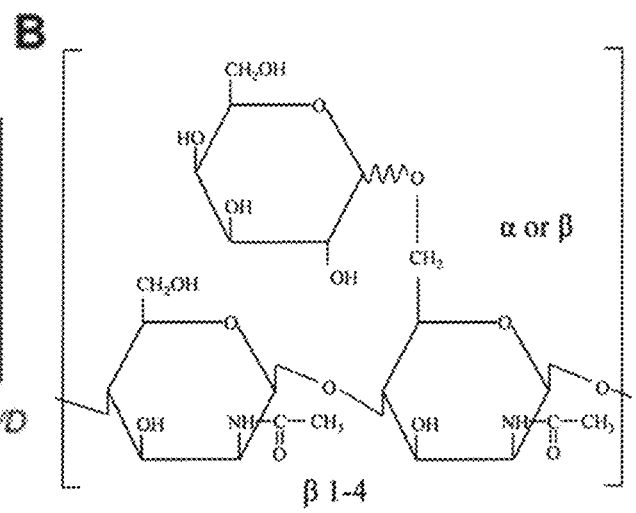
FIG. 1A
FIG. 1B
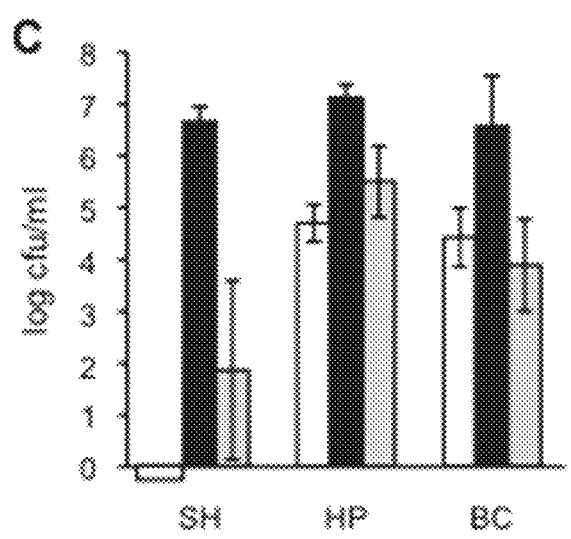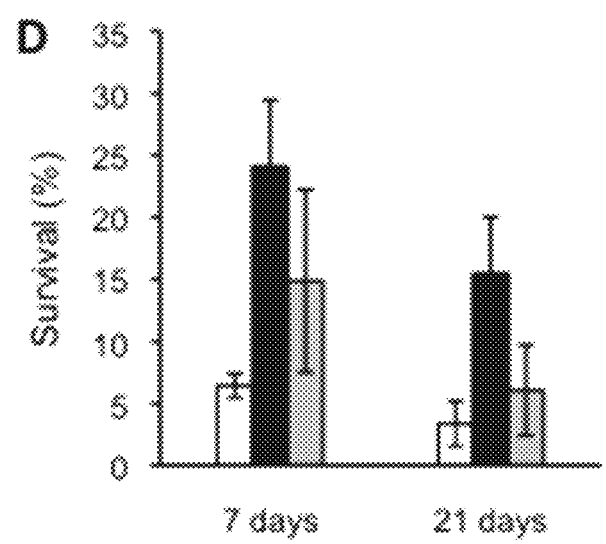
FIG. 1C
FIG. 1D

EGD-e

ΔpdeB/C/D

MATERIALS AND METHODS FOR PREVENTING AND DISPERSING EXOPOLYSACCHARIDE-CONTAINING BIOFILMS INVOLVING *LISTERIA MONOCYTOGENES*

CROSS-REFERENCE TO RELATED APPLICATIONS

This application claims the benefit of U.S. Application 63/227,732, filed under 35 U.S.C. § 111(b) on Jul. 30, 2021, and is incorporated by reference in the entirety.

STATEMENT REGARDING FEDERALLY SPONSORED RESEARCH

This invention was made with government support under project number WYO-00635-20 and grant number 2020-67014-32496, awarded by the United States Department of Agriculture, National Institute of Food and Agriculture. The government has certain rights in this invention.

BACKGROUND

The present specification generally relates to food safety, and, more specifically, to the use of specific materials and methods to inhibit or disperse exopolysaccharide-rich bacterial biofilms formed by *Listeria monocytogenes* on natural materials, including fresh food products.

Bacteria can form aggregates rich in extracellular substances, or biofilms, that pose formidable challenges in medicine and industry because of their resistance to antibiotics, disinfectants, desiccation, and other treatments. One common foodborne pathogen, *Listeria monocytogenes*, can form biofilms on food products, food-processing equipment, and in food storage facilities. Exopolysaccharide-rich biofilms increase *L. monocytogenes* attachment and survival on plant-based materials. Biofilms make the bacteria more resistant to common cleaning and disinfecting methods. When consumed by humans, *L. monocytogenes* may cause listeriosis, a severe disease that has the highest fatality rate of the common foodborne diseases in industrialized countries. Listeriosis is particularly dangerous for immunocompromised individuals, pregnant women, the elderly, and infants. Despite a relatively low number of cases, it is the third most costly foodborne disease in the USA, with the total annual financial loss estimated at $8.8 billion. Thus, there is a need for new and improved means for degrading preformed biofilms and for inhibiting or preventing biofilm formation by *L. monocytogenes.*

SUMMARY

Provided herein is a method of inhibiting biofilm formation or dispersing preformed exopolysaccharide-rich biofilms produced by *L. monocytogenes*. The method involves applying an effective amount of an anti-biofilm composition to a food product or food-contacting surface. The anti-biofilm composition may comprise a wood-derived aqueous extract, a wood chemical component, or a tree sap. In certain embodiments the wood is maple (*Acer*) or hickory (*Carya*). In certain embodiments, biofilms are formed by mixed species of bacteria and include the pathogen *L. monocytogenes*. A method of producing a crude extract of *Acer* is provided. A method of producing a crude extract of *Carya* is provided. An anti-biofilm agent comprising a glucoside composition is provided. Methods of using and producing aqueous formulations derived from hickory and maple wood are provided. Formulations and methods are provided for preventing or inhibiting listerial biofilms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-1D show the role of listerial exopolysaccharide (Pss EPS) in survival. FIG. 1A shows variation in cell aggregation in relation to EPS production by selected strains of *L. monocytogenes*. FIG. 1B shows a monomer unit of the Pss EPS. FIG. 1C illustrates EPS-related resistance of *L. monocytogenes* strains to disinfectant exposure. FIG. 1D illustrates EPS-related resistance of *L. monocytogenes* strains to desiccation.

FIGS. 2A-2B show formation of listerial biofilms on different materials. FIG. 2A shows biofilm growth after 30 hours incubation; FIG. 2B shows biofilm extent after 48 hours incubation. FIG. 2C shows an absense of biofilm formation for a strain with impaired EPS synthesis.

FIGS. 3A-3B show a comparison of bacterial growth on untreated produce samples FIG. 3A, and samples treated according to one of the described methods FIG. 3B.

FIG. 4 shows surface SEM images of listerial biofilms.

FIGS. 5A-5C show an example of biofilm hydrolysis and detection. FIG. 5A shows enzyme dispersal of EPS aggregates. FIG. 5B illustrates an example of florescent dye labeling. FIG. 5C shows EPS-specific binding with enzyme labeling.

FIG. 6 shows a flow chart for an example method.

The embodiments set forth in the drawings are illustrative and exemplary in nature and not intended to limit the subject matter defined by the claims. The following detailed description of the illustrative embodiments can be understood when read in conjunction with the drawings, wherein like reference numerals designate corresponding parts throughout the views.

DETAILED DESCRIPTION

Listeriosis is a foodborne disease caused by the pathogenic bacteria, *Listeria monocytogenes*. Listerial contamination is associated with two main food categories: (i) ready-to-eat meat, poultry, fish and dairy products, and (ii) fresh produce, such as fruits and vegetables, including leafy greens. In the past decade, the outbreaks caused by *listeria*-contaminated fresh produce have become more frequent and severe. *L. monocytogenes* forms biofilms on the surfaces of fresh produce. It has been found that an exopolysaccharide (EPS) synthesized by *listeria* is a prominent component of such biofilms. The EPS-based biofilms protect the bacteria from many commonly used disinfectants and protects it from desiccation. Therefore, EPS-based biofilms may increase listerial survival during produce washing, disinfection, transport and storage. An inexpensive treatment that can prevent formation of listerial biofilms on fresh produce or can degrade preformed biofilms could increase produce safety.

Produce consumption by Americans is growing as a reflection of consumer preferences for 'healthier', minimally processed foods. Unfortunately, listeriosis outbreaks caused by contaminated fresh produce have also been growing in recent decades. The stakeholder feedback solicited by USDA-NIFA for the Food Safety Challenge Area in 2016 revealed that *L. monocytogenes* and fresh produce are the food safety hazards and foods of most concern, respectively. Thus, there is a need to develop safe, inexpensive, and effective interventions for reducing contaminants in foods, and develop methods and strategies for the effective control of persistent reservoirs of foodborne pathogens.

The inventors have found that certain compositions, including aqueous extracts or sap derived from wood of certain tree species, including common species of maple and hickory, have potent antibiofilm properties against *L. monocytogenes* EPS biofilms. When applied in small quantities, such extracts block formation of listerial EPS-based biofilms on produce, such as cantaloupe rinds, and disperse existing biofilms. Aqueous extracts can be produced inexpensively from wood biomass, including for example, wood chips, wood shavings, sawdust, or derived from raw or concentrated tree sap, such as maple syrup. These extracts are generally regarded as safe (GRAS) and can be applied to fresh produce without requiring regulatory approval. Crude extracts, refined extracts, and active chemical constituents of the extracts can be used to inhibit and disperse listerial biofilms.

Wood extracts are generally regarded as safe (GRAS). Some wood extracts and wood-derived products, such as a French oak extract named Robuvit™, are used as health-promoting food supplements. Other tree products, such as maple syrup, are routinely consumed by millions of people.

Methods and formulations provided use an extract derived from the wood of certain trees to produce a composition effective to prevent, inhibit, or disperse bacterial biofilms produced by the pathogen, *Listeria monocytogenes*. The formulations may include a glucosidic compound. The formulations may include an aqueous extract from the wood of the maple tree (*Acer* sp.) or sap of the maple tree. The formulations may include an aqueous extract from the wood of the hickory tree (*Carya* sp.) or sap of the hickory tree.

*L. monocytogenes* undergoes a transformation from a soil-borne bacterial saprophyte to a life-threatening intracellular pathogen. *L. monocytogenes* causes the food-borne disease listeriosis, which is a relatively rare and yet highly fatal disease with a mortality rate of 20-25%. It follows *Salmonella* as the second leading cause of death due to food-borne bacterial outbreaks in the USA, where the annual health costs associated with listeriosis are estimated to be ~$8.8 billion per year. In recent years, the listeriosis incidence rate has been increasing in the USA and Europe. The elderly, immunocompromised individuals, newborns, and pregnant women are at high risk for life-threatening listeriosis with variable clinical manifestations such as meningitis, sepsis, bacteremia, miscarriages and stillbirth. In healthy individuals, *L. monocytogenes* causes flu-like symptoms and gastroenteritis.

Listeriosis can occur after consumption of food products contaminated with relatively high numbers (approximately $10^6$) of *L. monocytogenes* cells. Several major outbreaks of listeriosis in recent years have been caused by consumption of contaminated fresh produce. The food vehicles reported in listeriosis outbreaks have included cantaloupes, caramelized apples, celery, frozen vegetables, salads, sprouts, frozen cooked chicken, deli meats, frankfurters, cheese made from unpasteurized milk, and soft cheeses.

Over the past few decades, significant efforts have been made toward understanding how *L. monocytogenes* causes disease, and how to avoid food contamination by this pathogen at food-processing facilities. Post-process food contamination is common because *L. monocytogenes* persists in food processing plants, contaminates final products, and eventually reaches high numbers in foods. Indeed, *L. monocytogenes* can survive and multiply in harsh conditions owing to its ability to grow at cold temperatures, tolerate acidic and osmotic stresses and disinfectants, and form long-persisting biofilms. Some of these features have been attributed to specific transcriptional regulators, alternative sigma factors, two-component systems, transport proteins, and stress tolerance systems.

There has been, however, less research on how *L. monocytogenes* colonizes and grows on plants, including fruit and vegetable surfaces. It is important to better understand and control the mechanisms by which *L. monocytogenes* contaminates fresh produce, and how it survives on produce during storage and transportation.

In the natural environment, *listeria* are often found on decaying plant matter, where they grow in biofilms. This is in contrast with the overwhelming majority of studies of listerial biofilms, which utilize non-plant materials, such as steel, aluminum, glass, and plastics. Laboratory studies have typically used rich media, which contains peptides, amino acids, nucleic acids and lipids. Under such conditions *listeria* make extracellular matrix comprising proteins and extracellular DNA. However, the physico-chemical parameters of plant matter are different from those of non-plant materials, and, rich media nutrients are scarce on decaying plant matter, while sugars and organic acids are more abundant. Based on experimental data, the inventors have found that listerial biofilms formed on plants in minimal media are different from the biofilms on non-plant matter in rich media.

From the studies of plant-associated biofilms formed by other bacteria, it has been observed that pili and exopolysaccharides (EPS) may be present in the extracellular matrix of bacterial biofilms, yet for a long time *L. monocytogenes* was believed incapable of synthesizing these substances.

It has been found that *L. monocytogenes* can synthesize copious amounts of EPS, if cellular concentrations of the second messenger, cyclic dimeric GMP (c-di-GMP), are high. The inventors determined the structure of the listerial EPS (designated Pss), identified pss biosynthesis genes, and characterized a glycosylhydrolase, PssZ, that hydrolyzes listerial EPS, and disperses preformed EPS-biofilms, when added exogenously. All listerial genomes sequenced to date contain the pss operon, indicating that this EPS is evolutionarily important for listerial survival in the environment.

*L. monocytogenes* can produce a biofilm-forming exopolysaccharide (EPS), a polysaccharide composition that includes an N-acetylmannosamine (ManNAc)-based exopolysaccharide having a trisaccharide repeating unit of {4)-β-ManpNAc-(1-4)-[α-Galp-(1-6)]-β-ManpNAc-(1-}, wherein ManpNAc is N-acetylmannosamine and Galp is galactose. Cells embedded in EPS aggregates are much more tolerant to various disinfectants and to long-term desiccation. For example, exopolysaccharide-aggregated listerial cells show $>10^6$-fold higher survival rates when treated with bleach, compared to non-aggregated bacteria. Thus, biofilms are an important factor for listerial persistence in the environment and for food safety.

Data show that *L. monocytogenes* forms EPS-biofilms on various plant surfaces, including wood, fruits and vegetables. The inventors have developed biofilm control methods using extracts derived from wood to reduce listerial colonization, to inhibit biofilm formation, and to disperse biofilms. The inventors have developed a method of listerial EPS detection via a fluorescent probe, suitable to characterize the abundance of listerial EPS-biofilms on fresh produce and to better assay the effectiveness of biofilm control methods.

Turning now to FIG. 1, elevated intracellular c-di-GMP levels induce copious EPS production in *L. monocytogenes* resulting in cell aggregation, as shown in FIG. 1A with visible clumping of cultures grown overnight in minimal medium HTM with glucose. The Pss EPS is synthesized by the proteins encoded in the pssA-E operon.

FIG. 1B shows a monomer unit of the listerial Pss EPS; the chemical composition and structure of the Pss EPS is unique. The listerial EPS comprises units of {4)-β-ManpNAc-(1-4)-[α-Galp-(1-6)]-β-ManpNAc-(1-}, wherein ManpNAc is N-acetylmannosamine and Galp is galactose. The PssE protein acts as the c-di-GMP-dependent activator of EPS biosynthesis.

Importantly, the Pss EPS increases *L. monocytogenes* tolerance to desiccation by several-fold, as shown in FIG. 1D, and provides extraordinary increase ($10^2$-$10^6$-fold) in resistance to various disinfectants as shown in FIG. 1C.

As shown in FIG. 1C, the Pss EPS protects *L. monocytogenes* from disinfection agents. Cultures grown overnight were mixed with disinfectants for 10 min, neutralized, vortexed with glass beads to break cell aggregates, and plated. Colony forming units (cfu) were enumerated after 48 hours. The tested disinfectants included sodium hypochlorite (SH: bleach; 1600 ppm); hydrogen peroxide solution (HP: $H_2O_2$ 200 mM); and benzalkonium chloride (BC: 100 ppm). The white bar below zero indicates no cfu.

As shown in FIG. 1D, the Pss EPS protects *L. monocytogenes* from desiccation. Cell pellets were placed in a desiccator at room temperature for indicated periods. Percent survival is indicated, with the white bars corresponding to wild type *L. monocytogenes*; the black bars corresponding to the high c-di-GMP strain; and the grey bars corresponding to the high c-di-GMP strain impaired in EPS synthesis.

As shown in FIG. 2, to assess the role of EPS in plant biofilms, the high c-di-GMP strain, ΔpdeB/C/D, was inoculated in minimal liquid medium containing glucose, in the presence of wooden coupons. FIGS. 2A and 2B show, from left to right, a wooden coupon, an acrylic coupon, an aluminum coupon, and a steel coupon. FIG. 2A shows white EPS-biofilms formed by the high c-di-GMP strain (ΔpdeB/C/D) grown (30 h) in liquid minimal medium in the presence of wood and man-made materials. FIG. 2B shows the same coupons after 48 h incubation. The wooden coupon is completely covered with the white EPS biofilm, while little or no biofilms are visible on other materials. *L. monocytogenes* aggregates preferentially attached to the wood. In contrast, little or no EPS-biofilms were attached to the non-plant materials. This indicates that the Pss EPS promotes listerial colonization on the wood. FIG. 2C shows no EPS-biofilms were formed by the high c-di-GMP strain impaired in EPS synthesis.

As shown in FIG. 3, to test whether EPS-biofilms were formed on plant matter other than wood, the EPS-overproducing strain was grown in the presence of fresh produce associated with past listeriosis outbreaks. Listerial EPS-biofilms were readily formed on all tested fruits and vegetables, and the Pss EPS promotes listerial colonization on diverse plant surfaces. FIGS. 3A-3B show, from left to right, samples of cantaloupe, peach, and celery. The EPS overproducing strain (ΔpdeB/C/D) was grown in minimal liquid medium with glucose for 48 h with pieces of fresh produce. Samples shown in FIG. 3A were grown in the absence of a biofilm inhibiting agent. Samples shown in FIG. 3B were grown in the presence of a maple wood extract as a biofilm inhibiting agent (10 μL extract per mL media).

Turning now to FIG. 4, in contrast to voluminous biofilms formed by the high c-di-GMP strain, the wild type strain, EGD-e, formed barely visible biofilms. To assay whether the wild-type biofilms contained EPS, a more sensitive detection method, scanning electron microscopy (SEM), was used. FIG. 4 shows EPS fibers in the SEM images of the wild type, EGD-e, and the EPS overproducing strain, ΔpdeB/C/D, on the wood coupons. The data indicate that EPS is naturally synthesized by *L. monocytogenes* on plant surfaces. EPS fibers were also detected by SEM in biofilms formed by wild-type strains from the 2011 listeriosis outbreak.

Unexpectedly, EPS-biofilms formed on wooden coupons made of maple, but not oak, apple, or cherry wood, were spontaneously dispersed, after extended (60 h) incubation. The biofilm dispersal was found to have resulted from the gradual accumulation of a water-soluble antibiofilm compound leached from the wood.

Experiments were performed with soaked maple coupons or maple sawdust in water, and the effects of these aqueous extracts were tested. As shown in FIG. 3, it was found that small amounts of these extracts added to the growth medium strongly inhibit EPS-biofilm formation on various fruits and vegetables, including cantaloupe rinds, peach, and celery. Experiments demonstrated that a soluble or partially water-soluble compound from maple has a potent antibiofilm, but not antibacterial, activity. An aqueous extract from maple wood strongly inhibits formation of listerial biofilms.

Additional experiments have shown that maple sap, non-concentrated, or concentrated in the form of maple syrup, possesses the anti-listerial biofilm activity.

Further experiments indicate that hickory wood can be used to produce similar antibiofilm results. Maple wood and hickory wood are abundant and relatively inexpensive. Aqueous extractions can be prepared at large scale and low cost.

Turning now to FIGS. 5A-5C, to detect listerial EPS without invoking SEM, a Pss-specific fluorescent probe was developed based on the glycosylhydrolase PssZ. A soluble fragment of PssZ, when added exogenously, degrades preformed EPS-clumps, as shown in FIG. 5A, and prevents formation of new aggregates. Therefore, PssZ can be used for protecting fresh produce. An E72Q mutation impairs glycosylhydrolase activity of PssZ, but does not impair its ability to bind to the Pss EPS. As illustrated in FIG. 5B, the Pss detection fluorescent probe is based on the E72Q mutant (PssZ-FITC). Addition of PssZ disperses preformed EPS-clumps, while the PssZ mutant, PssZ E72Q, is enzymatically inactive. PssZ E72Q labeled with the fluorescent dye, FITC, on the lysine (K) residues. FIG. 5C shows EPS-specific binding of PssZ-FITC. The EPS-producing ΔpdeB/C/D cells bind PssZ-FITC turning cell pellet yellow (left), while the ΔpdeB/C/D ΔpssC cells incapable of EPS synthesis are white (right).

The method of listerial EPS detection via a fluorescent probe, can be used to characterize abundance of listerial EPS-biofilms on fresh produce.

The method of inhibiting and degrading listerial EPS with the wood extract, or its chemical derivative, can be used alone, or in conjunction with other methods, to treat produce or food-contacting surfaces. In an example, the wood extract and PssZ glycosylhydrolase enzyme are combined with water into a solution which is contacted with produce or equipment. The contact may be a rinse with a concentrated solution. The contact may be soaking for a selected time period. The method may be used to prevent biofilm formation on contacted surfaces of produce, processing equipment, or food contacting surfaces.

Assessment of variability among *L. monocytogenes* strains in forming EPS-biofilms on selected produce can be performed to optimize the method. In an example experiment to assess variability, the following steps may be used.

First, the methodology for listerial biofilm detection on a selected produce type is established. For example, cantaloupe rinds may be used as a model system. Pieces (coupons) of cantaloupe are inoculated in minimal medium in the presence of 3 strains: EGD-e (wild type), the EPS overproducing strain (ΔpdeB/C/D), and mutant impaired in EPS synthesis (ΔpdeB/C/D ΔpssC). The coupons are collected, and the EPS-biofilms are scraped with cell scrapers; the biofilm material is collected, vortexed in a binding buffer with glass beads to homogenize the insoluble Pss EPS, incubated with the PssZ-FITC probe, and washed to remove nonspecifically bound probe. The amount of PssZ-FITC bound to the EPS is quantified by fluorimetry. The EPS detection range of the PssZ-FITC probe, for the model system, is calibrated for EPS-biofilm detection on contaminated produce.

Next, selected strains are evaluated. In an example methodology, 20 different selected *L. monocytogenes* strains, isolated from contaminated melons, leafy greens, and other fresh produce, are tested. These strains belong to major listerial serotypes and include isolates from recent listeriosis outbreaks caused by contaminated produce. The strains are assessed to test differences in forming biofilms. Biofilms are assessed by PssZ-FITC measurements and SEM imaging. Bacterial loads (CFU) are quantified in parallel with EPS measurements to compare differences in biofilm production by different strains.

In another series of experiments, listerial EPS-biofilm detection and measurement of bacterial loads of produce in storage is assessed. In an example process, cantaloupes are used and maintained in selected conditions, which may include controlled temperature and humidity. Listerial suspensions are spotted on the rinds of whole cantaloupes, at pre-marked locations. The spots are allowed to dry in air, and sampled daily to test for listerial survival. Direct imaging of PssZ-FITC bound to EPS formed on cantaloupe surface can be carried out using an in vivo imaging system (NightOWL, Colorado State Univ.). To co-localize cells and EPS-biofilms, a staining protocol may be used, involving fluorescence in situ hybridization (FISH), in suspension or on adhesive tape surfaces. *Listeria* detection may be performed by the fluorescently-labeled peptide nucleic acid (PNA). The process can be used to evaluate and compare the various listerial strains for forming biofilms on the selected produce type, such as cantaloupe rinds.

Determining the effects of produce type, storage conditions, and other treatments on listerial biofilms can be performed to optimize the method. In an example experiment to assess the effects of produce type, storage conditions, and other treatments, the following steps may be used. to characterize the susceptibility of fresh produce to listerial EPS-biofilms.

To determine how various fruits and vegetables affect formation of listerial EPS-biofilms, the methodology described previously can be used with selected produce. In an example process, produce types are selected, for example: stone fruit (plums, cherries, peaches, nectarines, and pluots), melons, broccoli florets, cauliflower florets, celery stalks, spinach leaves, and lettuce leaves. These sample produce types span substantial diversity in composition and porosity, characteristics which can affect listerial attachment and EPS-biofilm levels.

To determine how conditions of produce processing and storage affect EPS biofilms, the biofilm assessment methodology can be used on model produce types subjected to selected treatments, processing, and storage conditions. For example, characterization of storage and processing conditions on biofilm formation may include: effects of waxing, storage in air or controlled atmosphere packaging, storage temperature, varying humidity, and application of fungicides. EPS-biofilm levels are quantified along with bacterial enumeration using culture-based methods.

By characterizing the varying susceptibility of differing types of produce that are vulnerable to listerial biofilms and the processing conditions that promote biofilm formation, the treatment methods can be optimized to inhibit biofilm formation. Additionally, the conditions that predispose produce to listerial colonization can be monitored and controlled.

Assessment of selected aqueous maple and hickory extracts to prevent listerial colonization of produce can be performed to optimize the treatment method and enhance effectiveness.

The antibiofilm activity of the aqueous wood extract can vary and that variability can be evaluated and managed by assessing and controlling selected factors. The preparation of the extract solution may be adjusted accordingly. Some relevant factors may include organic and inorganic loading, pH, water hardness, treatment time, and temperature. Additionally, the method may be characterized with respect to selected species in the genus of maple (*Acer*) and hickory (*Carya*). The effect of wood age, type, and preparation method can be further evaluated to optimize the treatment. Selected conditions relevant to washing, storage and transportation of specific produce types can be assessed using a checkerboard format and selected ranges to test the effects of these factors.

The extract can be applied by submerging produce in wash water containing the extract, or, alternately, by spraying the extract. The spot inoculation method can be used to assess the effect of the wood extract on listerial EPS-biofilms, as described above using cantaloupe rinds, and test produce susceptible to biofilms.

The quantitative and qualitative data on the efficacy of the aqueous maple or hickory wood extract in protecting fresh produce from listerial colonization can be used to further optimize the method and improve the efficacy of the wood extract to protect produce from *L. monocytogenes* colonization under the conditions of produce processing.

To identify active components responsible for preventing EPS-biofilm formation by *L. monocytogenes*, major ingredients from methanol extract of dried red maple stems, *Acer rubrum*, were tested. The tested compositions included catechin, epicatechin, procyanidin A2, epicatechin gallate, nortrachelogenin (also known as pinopalustrin), and nortrachelogenin 8'-O-β-D-glucopyranoside (also known as nortrachelogenin-8'-O-beta-glucoside).

The structure of nortrachelogenin 8'-O-β-D-glucopyranoside may be illustrated as:

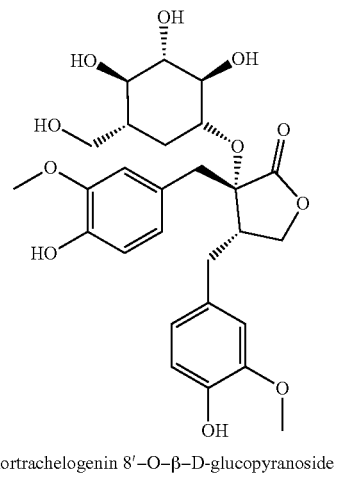

nortrachelogenin 8'–O–β–D-glucopyranoside

Formula 1

Of the tested compositions, nortrachelogenin 8'-O-β-D-glucopyranoside, (Formula 1), was found to have antibiofilm activity, similar to that of the aqueous maple extracts. Other major ingredients of the maple methanol extract, including catechin, epicatechin, procyanidin A2, and epicatechin gallate had no effect. Likewise, no significant antibiofilm activity was detected for nortrachelogenin alone, lacking a glucoside moiety as compared to nortrachelogenin 8'-O-β-D-glucopyrano side.

In addition to its presence in maple, nortrachelogenin 8'-O-β-D-glucopyranoside is an abundant chemical compound in star jasmine, also known as confederate jasmine, *Trachelospermum* jasminoides. Thus, compositions containing nortrachelogenin 8'-O-β-D-glucopyranoside may be produced from aqueous extracts and extracts involving polar organic chemicals, such as methanol, ethanol, ethyl acetate, and DMSO, of the biomass of *Trachelospermum* jasminoides and other species in the family *Trachelospermum*. These extracts may be used in compositions to produce anti-biofilm activity against *L. monocytogenes*.

Assessment of combination treatments can be performed. For example, a wood extract or other plant-derived composition may be used in combination with an enzyme treatment to inhibit colonization of food products by *L. monocytogenes*. In an example method an enzyme, Pss EPS hydrolase, PssZ, and its homologs may be used to prevent produce colonization by *L. monocytogenes*.

In an example process, comparative treatments are assessed. The methods described above are used to assess pre-treating produce with the Pss EPS hydrolase (PssZ) alone, in combination with the wood extract, or with the wood extract alone. A soluble fragment of the recombinant PssZ protein can be produced in large quantities.

PssZ enzymes can be made by recombinant methods. For example, a suitable enzyme may include a produced PssZ protein lacking the N-terminal transmembrane domain and may be made with an added C-terminal His6-tag for purification purpose from *E. coli*. These recombinant enzymes may include 4-5 PssZ homologs. The pssZ homologous genes may be codon-optimized for *E. coli*, commercially synthesized, and cloned in an overexpression vector (e.g., pET28). The proteins can be overexpressed in *E. coli* BL21[DE3], and purified via affinity (Ni-NTA resin) chromatography. The Pss EPS activities of these homologs can be characterized using listerial EPS-clumps at different temperatures, pH, salt and detergent concentrations.

PssZ homologs may be selected to produce an enzyme with listerial-EPS hydrolytic activity over a broader range of processing conditions, including temperature and pH. Homologs of listerial PssZ enzyme from extremophile organisms have been identified. Using bioinformatic analysis, listerial PssZ homologs have been identified in the genomes of bacteria that grow in extreme environments, such as cold (e.g. *Exiguobacterium undae*), hot (e.g. *Bacillus thermotolerans*), high salinity and high pH (e.g. *Jeotgalibacillus campisalis*) environments. Homologs of listerial PssZ enzyme may be selected for activity at selected pH and temperature ranges, compatible with produce washing, disinfection and storage conditions. For example, enzymes with higher hydrolytic activity at low temperatures could be added directly to produce washes, while homologs active at alkaline pH and tolerant to detergents can be applied in combination with these reagents. In some examples the enzyme may be stabilized by adsorbtion, covalent binding, crosslinking, entrapment, reverse micelleation, chemical modification, lyophilization, protein engineering, ionic liquid coating, or stabilizing additives. U.S. Pat. No. 10,383,338 describes methods for making and using PssZ enzymes and is incorporated by reference herein.

In an example, the effectiveness is assessed of the pre-treatment with PssZ homologs in the removal of listerial biofilms from whole cantaloupes and other produce types. Also, the efficiency of a combination of PssZ and the wood extract can be assessed for protecting produce from listerial colonization.

In an example, whole cantaloupes are sprayed with a first solution comprising an aqueous maple wood extract or with a second solution comprising a combination of an aqueous maple wood extract and PssZ enzyme. A control group is sprayed with water. The whole cantaloupes are then contacted with a *L. monocytogenes* inoculant and incubated for 1-3 days. Biofilm formation and bacterial load are compared between the treatment groups.

In another example, control and experimental samples of produce are inoculated with *L. monocytogenes*, and divided into treatment groups. A first group is subjected to a wood extract treatment. A second group is subjected to a PssZ enzyme treatment. A third group is subjected to a PssZ enzyme treatment, followed by a wood extract treatment. A fourth group is subjected to a wood extract treatment, followed by an enzyme treatment. A fifth group is subjected to simultaneous treatment with an aqueous solution containing both a wood extract and the PssZ enzyme. A control group is subjected to a treatment with water. Post treatment assessment is performed to detect listerial EPS-biofilms and measure bacterial loads.

In an example process, an aqueous wood extract was prepared from maple wood chips soaked in liquid water. 10 g sterile chips were soaked in 100 mL sterile water for 2 days, the chips were subsequently filtered out, and the aqueous extract collected. The extract may be sterilized by passing through a 0.22 microM membrane filter or by autoclaving, and can be applied to listerial biofilms.

In an example process, an aqueous wood extract is prepared from hickory wood chips soaked in liquid water, using the same procedure as described above.

In another example process, wood biomass is added to water in a ratio of 10-500 grams of wood per liter. In one example the water is heated to a temperature in a range of 35 C to 100 C, the wood biomass is added and the water cools to room temperature in contact with the wood biomass, the liquid is then strained to provide a wood extract in an aqueous solution.

In an example, steam is passed through wood chips and condensed to liquid to produce a wood extract in an aqueous solution.

In an example, wood biomass is soaked in tepid water having a temperature in a range of 20 C to 30 C.

In an example, wood biomass is soaked in cold water having a temperature in a range of 0 C to 20 C.

In an example wood biomass is soaked for a period of 1 to 48 hours.

In an example process, the wood biomass is wood chips having a surface area to weight ratio in a range of 0.1 cm/g to 10 cm/g. In an example process, the ratio, by weight, of wood chips to water is in a range of 1:10 to 10:1. In an example process, the ratio, by weight, of wood chips to water is in a range of 1:100 to 1:1. In an example, the wood chips are sawdust. In an example, the wood chips are wood fragments with a surface area (cm$^2$) to volume (cm$^3$) ratio of less than 10:1. In an example, the wood biomass is wood fragments, wherein at least 50% of the wood chips have a longest dimension through a center point in a range of 0.5 cm to 10 cm, and a narrowest dimension through a center point in a range of 0.01 cm to 5.0 cm.

In an example, the wood biomass includes at least one of: heartwood, sapwood, pith, twigs, leaves, stems, branches, nut shells, sap, roots, or bark. In an example, the wood biomass includes at least 30% heartwood and at least 20% sapwood. In an example, the wood chips include tree wood derived from a portion of a tree having a diameter greater than 5 cm. In an example, the wood biomass comprises sap.

In an example the extract forms a part of a composition. The composition may be applied to items and surfaces to inhibit or disperse biofilm formation. The composition may comprise the extract and may comprise one or more adjuvents. The extract may be present at a concentration of about 10 mL/L, or at a per-volume ratio of extract to total-composition-volume of about 1:100. In some embodiments, the ratio by volume is equal to or greater than 1:1000, 1:500, 1:200, 1:100, 1:50, or 1:10. In some embodiments, the ratio by volume is less than or equal to 1:1, 1:2, 1:5, 1:10, 1:20, 1:50, 1:100, or 1:200.

In an example, the wood biomass includes at least one of hickory (*Carya* sp.) or maple (*Acer* sp.).

In an example, the wood biomass is derived from maple wood. In an example, the maple is an *Acer* tree selected from: *Acer nigrum, Acer lanurn, Acer acuminatum, Acer albopurpurascens, Acer argutum, Acer barbinerve, Acer buergerianum, Acer caesium, Acer campbeffii, Acer campestre, Acer capillipes, Acer cappadocicum, Acer carpinifolium, Acer caudatifolium, Acer caudatum, Acer cinnamomifolium, Acer circinatum, Acer cissifolium, Acer crassum, Acer crataegifolium, Acer davidii, Acer decandrum, Acer diabolicum, Acer distylum, Acer divergens, Acer erianthum, Acer erythranthum, Acer fabri, Acer garrettii, Acer glabrum, Acer grandidentatum, Acer griseum, Acer heldreichii, Acer henryi, Acer hyrcanum, Acer ibericum, Acer japonicum, Acer kungshanense, Acer kweilinense, Acer laevigatum, Acer laurinum, Acer lobelii, Acer lucidum, Acer macrophyllum, Acer mandshuricum, Acer maximowiczianum, Acer miaoshanicum, Acer micranthum, Acer miyabei, Acer mono, Acer monspessulanum, Acer negundo, Acer ningpoense, Acer nipponicum, Acer oblongum, Acer obtusifolium, Acer oliverianum, Acer opalus, Acer palmatum, Acer paxii, Acer pectinatum, Acer pensylvanicum, Acer pentaphyllum, Acer pentapomicum, Acer peronai, Acer pictum, Acer pilosum, Acer platanoides, Acer poliophyllum, Acer x pseudoheldreichii, Acer pseudoplatanus, Acer pseudosieboldianum, Acer pubinerve, Acer pycnanthum, Acer rubrum, Acer rufinerve, Acer saccharinum, Acer saccharum, Acer sempervirens, Acer shirasawanum, Acer sieboldianum, Acer sinopurpurescens, Acer spicatum, Acer stachyophyllum, Acer sterculiaceum, Acer takesimense, Acer tataricum, Acer tegmentosum, Acer tenuifolium, Acer tetramerum, Acer trautvetteri, Acer triflorum, Acer truncatum, Acer tschonoskii, Acer turcomanicum, Acer ukurunduense, Acer velutinum, Acer wardii*, or hybrids thereof.

In an example, the maple is a hard maple including at least one of: sugar maple, *Acer saccharum*, or black maple, *Acer nigrum*. In an example, the maple is a soft maple including at least one of: bigleaf maple (*Acer macrophyllum*), red maple (*Acer rubrum*), silver maple (*Acer saccharinum*), or boxelder (*Acer negundo*).

In an example, the wood biomass is derived from hickory. In an example, the hickory includes at least one of: Shagbark Hickory (*Carya ovata*), Bitternut Hickory (*Carya cordiformis*), Mockernut Hickory (*Carya tomentosa*), Nutmeg Hickory (*Carya myristiciformis*), Pecan (*Carya illinoinensis*), Pignut Hickory (*Carya glabra*), Shellbark Hickory (*Carya laciniosa*), or Water Hickory (*Carya aquatica*).

An efficacious wood extract can be prepared to inhibit and disperse listerial biofilms. An active moiety of the wood extract, suitable to inhibit and disintegrate listerial biofilms, is substantially temperature insensitive, tolerant to drying, and widely distributed within tree tissues. The extract can be prepared, for example, by soaking dried or fresh plant tissues in cold water for a period of 1-7 days. The tree tissues, from which the wood extract can be produced, can include wood pieces, wood chips, branches, twigs, leaves, seeds or nutshells, flowers, bark, or roots. The wood extract can also be produced using hot water in a shorter time period. Solvents can also be used in the extraction process.

Advantageously, a wood-derived aqueous solution can be produced efficiently and inexpensively. A combination treatment with both a wood-derived solution and PssZ enzyme might be applied at a greater cost, however the benefits may outweigh the costs especially in selected instances where contamination is a greater risk. *L. monocytogenes* is one of the most notorious foodborne pathogens. When consumed by immunocompromised individuals, pregnant women, the elderly and infants, *L. monocytogenes* can cause severe listeriosis, a disease that has one of the highest (~20%) fatality rates of the foodborne diseases. Thus, while application of an enzyme to fresh produce may be expensive, it could be justified by circumstances, such as for the pretreatment of produce designated for immunocompromised individuals, pregnant women, infants, and the elderly. For example, the combination treatment could be applied to produce intended for hospitals or assisted living facilities.

Without wishing to be bound by theory, experimental data indicate that listerial biofilms on plant matter can differ drastically from the biofilms formed on non-plant surfaces. To further elucidate the mechanisms associated with listerial biofilms, a combination of analytical chemical, biochemical, molecular biological and microbiological methods can be used.

Aqueous extracts of wood from maple and hickory trees have been demonstrated to have anti-biofilm properties. Anti-biofilm components or compositions from tree extracts can be analyzed to identify and characterize mechanisms of EPS-biofilm inhibition. To identify active antibiofilm components in maple, the aqueous maple extract is fractionated, using separation protocols, such as size exclusion chromatography, thin-layer chromatography, and HPLC. Each fraction is tested for antibiofilm activity.

An anti-biofilm composition or agent can comprise an aqueous wood extract. An anti-biofilm agent can comprise nortrachelogenin 8'-O-β-D-glucopyranoside. Methods of inhibiting or dispersing listerial bioflims include applying an effective amount of the composition to a surface.

Prevention of listerial biofilm formation is important to food processing, including harvesting, preparing, packaging, and serving. In an example, a solution comprising the anti-biofilm agent is applied to growing produce before harvest. In an example, a solution comprising the anti-biofilm agent is applied to produce during a harvesting process. The solution may be used to rinse, soak, spray, or clean plant surfaces and other substrates, including porous natural substrates.

In an example treatment method, a composition comprising the anti-biofilm agent in an aqueous solution is applied to a food product by spraying, soaking, or rinsing. In an example treatment method, a composition of an aqueous solution comprising nortrachelogenin 8'-O-β-D-glucopyranoside is applied to a food product by spraying, soaking, or rinsing. In an example, the food product comprises an edible plant. In an example, the food product is fresh produce. In an example, the food product is at least one of: bean sprouts, alfalfa sprouts, radish sprouts, lettuce, spinach, watercress, arugula, salad greens, wheat grass, cantaloupe, honeydew, watermelon, peach, cherry, nectarine, plucot, apricot, or plum. In an example, produce is soaked in the aqueous solution for a period in a range of 5 to 60 minutes. In an example, leafy greens are sprayed with the composition prior to packaging into a packaged salad product.

Prevention of listerial biofilm formation is also relevant to the dairy industry and to packaged food producers. In an example treatment method, a solution comprising the anti-biofilm agent is applied to surfaces in a food processing facility. In an example treatment method, a solution comprising the anti-biofilm agent is provided in a boot wash tray for use by workers in a food processing facility. In an example, the food processing facility is a dairy processing facility or a produce packaging facility. In an example treatment method, a solution comprising the anti-biofilm agent is applied to hay, straw, silage, animal fodder, animal bedding, or an animal stall. In another example treatment method, a solution comprising the anti-biofilm agent is applied to skin, for example, to the hands of an animal handler, to the hide of an animal, or to the udders of an animal. In an example, the anti-biofilm agent is incorporated into an emulsion, a suspension, a foam, or a cream.

In an example treatment method, a composition including the anti-biofilm agent is applied to a food contacting surface by spraying, soaking, or rinsing. In embodiments, the composition including the anti-biofilm agent is applied to a porous surface and the porous surface is part of a food container, a food-contacting surface, or a surface in a food production facility. In embodiments, the food contacting surface comprises a porous material such as wood, wicker, rope, paper, cardboard, bamboo, sponge, or cloth. In embodiments, the porous material is a plant-based natural material. In an example, the food contacting surface includes at least one of: a bin, a crate, a box, a tray, a mat, a spout, a bucket, a cloth, a cheesecloth, a cutting board, a net, a bag, a sponge, a basket, a carton, a countertop, or packing material.

In an example treatment method, the composition including the anti-biofilm agent further includes an enzyme. In an example, the enzyme comprises a recombinantly produced PssZ protein. In an example, a concentration of the PssZ enzyme in the solution ranges from about 0.1 nM/L to about 500 mM/L.

A antiproliferative composition for inhibiting bacterial biofilm formation is provided. In an embodiment, the composition comprises a wood extract, a solvent, and an enzyme. In an embodiment, the composition further comprises an adjuvant or additive. In an embodiment, an additive is selected from the group consisting of: surfactants; emulsifiers; thickening agents; spreaders; stickers; oils; penetrants; and wetting agents. In an embodiment, the wood extract is derived from maple, the solvent comprises water and ethanol, and the enzyme comprises a PssZ enzyme. In an embodiment, the composition further comprises a protease or hydrolase. In an embodiment, the composition consists essentially of a wood extract, a solvent, and an enzyme.

Provided is a treatment method and a composition for inhibiting bacterial biofilm formation. Provided is a method and a composition for disintegrating a bacterial aggregate. Further provided is a method and a composition for inhibiting aggregation of *L. monocytogenes*. Further provided is a method and a composition for dispersing a preformed listerial EPS aggregate. Provided is a method and a composition for preventing bacterial EPS-dependent aggregation.

In an example, the composition further comprises a coating enhancer to modify the rheometric properties and viscosity of the composition. The coating enhancer may include starch, amylose, amylopectin, dextrin, maltodextrin, polydextrose, syrup, cellulose, gum Arabic, gum tragacanth, gum karaya, mesquite gum, galactomannan, pectin, carrageenan, alginate, dextran, xanthan, gellan, whey protein, silk protein, casein, gelatin, gluten, fatty acids, fatty alcohols, wax, beeswax, carnauba wax, candellia wax, glyceride, and phospholipid, PVP, paraffin, shellac, or a solgel. In an example method, the composition substantially coats a surface and forms a dried residue on the surface. In an example method, the composition may be applied to a natural or porous surface with a coating enhancer to form a biofilm-inhibiting coating, film, or residue on the surface.

In an example, the composition further comprises an antimicrobial compound. In an example, the composition further comprises a detergent or surfactant. In an example, the composition comprises an antifungal composition, such as natamycin. In an example, the composition exclusively consists of food-safe or GRAS ingredients.

Provided is a method for preparing a wood extract composition. An example method includes extracting plant tissue of *Acer* or *Carya* with a solvent to form a crude extract; and mixing a non-toxic amount of the crude extract with one or more additives or adjuvants to produce a treatment composition. In an example, the composition is a wood-derived composition produced by soaking maple wood in water. In an example, the wood is soaked in water for a period in a range of 4 hours to 7 days, or in a range of 12 hours to 5 days, and strained to produce an infused solution or a crude extract. In another example process, the infused solution is boiled. In an example preparation method the infused solution is concentrated by removing some portion of the water to form a concentrated product. In another example, the infused solution is dried to form a dried product. In an example process the infused solution is filtered and lyophilized. In another example, a tree sap is concentrated to make a concentrated product, in some embodiments the concentrated product is a maple or hickory syrup. In an example treatment method, a concentrated product or dried product is rehydrated and applied to a surface to degrade or inhibit a biofilm on the surface.

Provided is a method for preparing an antifouling composition comprising a wood extract. In an example, the composition is an aqueous wood extract. In an example, the composition further comprises an alcohol. In an example, the composition comprises ethanol.

Provided is a detection method for detecting a listerial biofilm on a surface comprising: providing a modified PssZ enzyme, wherein the modified PssZ enzyme retains EPS binding capacity but retains no substantial hydrolytic activity to hydrolyze or degrade a listerial EPS.

Further provided is a method for detecting a listerial biofilm on a surface comprising: providing a modified PssZ enzyme, wherein the modified PssZ enzyme has functional activity to bind to a listerial Pss exopolysaccharide, and contacting the surface with the modified PssZ enzyme, whereby the modified PssZ enzyme binds to the listerial exopolysaccharide comprising the listerial biofilm. In an example the modified PssZ enzyme is derived from a PssZ E72Q mutant. In an example the method further comprises detection of a fluorescent probe bound to the modified PssZ enzyme. In an example method, a treatment composition comprising a wood extract is applied to a surface if a listerial biofilm is detected.

In some embodiments, the anti-biofilm agent is provided in a treatment composition, and the composition comprises a liquid, an aqueous solution, an emulsion, a foam, a suspension, aerosolized droplets, or a spray. In an example, the treatment composition comprises a wood extract solution having nortrachelogenin 8'-O-β-D-glucopyranoside in the solution.

In some embodiments, the composition comprises a concentration of nortrachelogenin 8'-O-β-D-glucopyranoside at a level in a range from 0.5 mg/mL to 5 mg/mL. In some embodiments the concentration of nortrachelogenin 8'-O-β-D-glucopyranoside in the composition is greater than 0.3 g/L, greater than 0.4 g/L, greater than or equal to 0.5 g/L, greater than or equal to 0.7 g/L, greater than or equal to 0.9 g/L, greater than or equal to 1.0 g/L, greater than or equal to 1.5 g/L, greater than or equal to 2.0 g/L, greater than or equal to 2.5 g/L, greater than or equal to 3.0 g/L, greater than or equal to 3.5 g/L, greater than or equal to 4.0 g/L, or greater than or equal to 4.5 g/L. In some embodiments the concentration of nortrachelogenin 8'-O-β-D-glucopyranoside in the composition is less than 7.0 g/L, less than 6.5 g/L, less than to 6.0 g/L, less than or equal to 5.5 g/L, less than or equal to 5.0 g/L, less than or equal to 4.5 g/L, less than or equal to 4.0 g/L, less than or equal to 3.5 g/L, less than or equal to 3.0 g/L, or less than or equal to 2.5 g/L.

In some embodiments, the anti-biofilm agent comprises a hickory or maple wood extract, and the wood extract comprises at least one polyphenolic compound with antibiofilm activity to listerial biofilms. In some embodiments, the polyphenolic compound is a lignan. In some embodiments, the polyphenolic compound is a glucoside. In some embodiments, the polyphenolic compound is nortrachelogenin 8'-O-β-D-glucopyranoside. In some embodiments, the antibiofilm agent comprises nortrachelogenin 8'-O-β-D-glucopyranoside. In some embodiments, the anti-biofilm agent comprises purified, isolated nortrachelogenin 8'-O-β-D-glucopyranoside.

Throughout this disclosure, various publications, patents, or published patent specifications may be referenced. The disclosures of these publications, patents, and published patent specifications are hereby incorporated by reference into the present disclosure to more fully describe materials and methods which may be used in conjunction with aspects of the described invention.

Certain embodiments of the devices, apparatuses, and methods disclosed herein are defined in the above examples. It should be understood that these examples, while indicating particular embodiments, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure, and to adapt a particular situation or material to the teachings of the disclosure

What is claimed is:

1. A method of treating a biofilm on a porous surface, comprising:
   contacting the porous surface with an antibiofilm composition comprising a wood extract,
      wherein the wood extract comprises a wood chip biomass infusion, and
      wherein the wood is maple or hickory, and
   wherein the biofilm comprises an exopolysaccharide-rich aggregate formed by *Listeria monocytogenes*.

2. The method of claim 1, wherein the porous surface is a part of a food product.

3. The method of claim 1, wherein the porous surface is part of an edible plant product comprising a fruit, a vegetable, or a leafy green.

4. The method of claim 1, wherein the wood extract comprises a glucosidic compound.

5. The method of claim 1, wherein the wood extract comprises nortrachelogenin 8'-O-β-D-glucopyranoside, and wherein a concentration of nortrachelogenin 8'-O-β-D-glucopyranoside in the antibiofilm composition is in a range from 0.5 mg/mL to 5 mg/mL.

6. The method of claim 1, wherein the antibiofilm composition further comprises an enzyme.

7. The method of claim 1, wherein the antibiofilm composition consists of non-toxic and food-safe ingredients and is applied to disperse the biofilm, thereby preventing or mitigating risk of listeriosis.

8. The method of claim 1, wherein the contacting further comprises:

applying the composition to the porous surface, wherein the composition further comprises a coating enhancer, to form a biofilm-inhibiting residue on the surface, wherein the biofilm-inhibiting residue inhibits formation of biofilms produced by *L. monocytogenes.*

9. The method of claim 1, wherein the wood extract is formulated as an aqueous solution further comprising one or more adjuvants.

10. The method of claim 1, wherein the wood extract is prepared by water extraction.

11. The method of claim 1, wherein the wood extract comprises a maple extract.

12. The method of claim 1, wherein the wood extract comprises a hickory extract.

13. The method of claim 1, wherein the antibiofilm composition comprises one or more additives, wherein the one or more additives are selected from the group consisting of: an enzyme; an antifungal; an antimicrobial; a detergent;

a surfactant; an emulsifier; a thickening agent; a coating agent; a spreader; a sticker; an oil; a penetrant; or a wetting agent.

14. A method of treating a biofilm on a porous surface, comprising:
contacting the porous surface with an antibiofilm composition comprising a wood extract,
wherein the porous surface is a part of a food product, wherein the wood extract comprises maple sap or maple syrup, and wherein the biofilm comprises an exopolysaccharide-rich aggregate formed by *Listeria monocytogenes*.

15. The method of claim 14, wherein the porous surface is part of an edible plant product comprising a fruit, a vegetable, or a leafy green.

16. The method of claim 14, wherein the wood extract comprises a glucosidic compound.

17. The method of claim 14, wherein the wood extract comprises nortrachelogenin 8'-O-β-D-glucopyranoside, and wherein a concentration of nortrachelogenin 8'-O-β-D-glucopyranoside in the antibiofilm composition is in a range from 0.5 mg/mL to 5 mg/mL.

18. The method of claim 14, wherein the antibiofilm composition further comprises an enzyme.

19. The method of claim 14, wherein the antibiofilm composition consists of non-toxic and food-safe ingredients and is applied to disperse the biofilm, thereby preventing or mitigating risk of listeriosis.

20. The method of claim 1, wherein the contacting further comprises:
applying the composition to the porous surface, wherein the composition further comprises a coating enhancer, to form a biofilm-inhibiting residue on the surface, wherein the biofilm-inhibiting residue inhibits formation of biofilms produced by *L. monocytogenes*.

21. The method of claim 14, wherein the wood extract is formulated as an aqueous solution further comprising one or more adjuvants.

22. The method of claim 14, wherein the wood extract is prepared by water extraction.

23. The method of claim 14, wherein the antibiofilm composition comprises one or more additives, wherein the one or more additives are selected from the group consisting of: an enzyme; an antifungal; an antimicrobial; a detergent; a surfactant; an emulsifier; a thickening agent; a coating agent; a spreader; a sticker; an oil; a penetrant; or a wetting agent.

24. A method of treating a biofilm on a porous surface, comprising:
contacting the porous surface with an antibiofilm composition comprising a wood extract,
wherein the porous surface is a part of a food product, wherein the wood is maple,
wherein the wood extract comprises a glucosidic compound, and wherein the biofilm comprises an exopolysaccharide-rich aggregate formed by *Listeria monocytogenes*.

25. The method of claim 24, wherein the porous surface is part of an edible plant product comprising a fruit, a vegetable, or a leafy green.

26. The method of claim 24, wherein the wood extract comprises nortrachelogenin 8'-O-β-D-glucopyranoside, and wherein a concentration of nortrachelogenin 8'-O-β-D-glucopyranoside in the antibiofilm composition is in a range from 0.5 mg/mL to 5 mg/mL.

27. The method of claim 24, wherein the antibiofilm composition further comprises an enzyme.

28. The method of claim 24, wherein the antibiofilm composition consists of non-toxic and food-safe ingredients and is applied to disperse the biofilm, thereby preventing or mitigating risk of listeriosis.

29. The method of claim 24, wherein the contacting further comprises:
applying the composition to the porous surface, wherein the composition further comprises a coating enhancer, to form a biofilm-inhibiting residue on the surface, wherein the biofilm-inhibiting residue inhibits formation of biofilms produced by *L. monocytogenes*.

30. The method of claim 24, wherein the wood extract is formulated as an aqueous solution further comprising one or more adjuvants.

31. The method of claim 24, wherein the wood extract is prepared by water extraction.

32. The method of claim 24, wherein the antibiofilm composition comprises one or more additives, wherein the one or more additives are selected from the group consisting of: an enzyme; an antifungal; an antimicrobial; a detergent; a surfactant; an emulsifier; a thickening agent; a coating agent; a spreader; a sticker; an oil; a penetrant; or a wetting agent.

33. A method of treating a biofilm on a porous surface, comprising:
contacting the porous surface with an antibiofilm composition comprising a wood extract,
wherein the wood is maple or hickory, and
wherein the wood extract comprises nortrachelogenin 8'-O-β-D-glucopyranoside, and wherein a concentration of nortrachelogenin 8'-O-β-D-glucopyranoside in the antibiofilm composition is in a range from 0.3 g/L to 7.0 g/L, and
wherein the biofilm comprises an exopolysaccharide-rich aggregate formed by *Listeria monocytogenes*.

34. The method of claim 33, wherein the porous surface is a part of a food product.

35. The method of claim 33, wherein the porous surface is part of an edible plant product comprising a fruit, a vegetable, or a leafy green.

36. The method of claim 33, wherein the wood extract comprises a glucosidic compound.

37. The method of claim 33, the concentration of nortrachelogenin 8'-O-β-D-glucopyranoside in the antibiofilm composition is in a range from 0.5 g/L to 5.0 g/L.

38. The method of claim 33, wherein the antibiofilm composition further comprises an enzyme.

39. The method of claim 33, wherein the antibiofilm composition consists of non-toxic and food-safe ingredients and is applied to disperse the biofilm, thereby preventing or mitigating risk of listeriosis.

40. The method of claim 33, wherein the contacting further comprises:
applying the composition to the porous surface, wherein the composition further comprises a coating enhancer, to form a biofilm-inhibiting residue on the surface, wherein the biofilm-inhibiting residue inhibits formation of biofilms produced by *L. monocytogenes*.

41. The method of claim 33, wherein the wood extract is formulated as an aqueous solution further comprising one or more adjuvants.

42. The method of claim 33, wherein the wood extract is prepared by water extraction.

43. The method of claim 33, wherein the wood extract comprises a maple extract.

44. The method of claim 33, wherein the wood extract comprises a hickory extract.

45. The method of claim 33, wherein the antibiofilm composition comprises one or more additives, wherein the one or more additives are selected from the group consisting of: an enzyme; an antifungal; an antimicrobial; a detergent; a surfactant; an emulsifier; a thickening agent; a coating agent; a spreader; a sticker; an oil; a penetrant; or a wetting agent.

* * * * *

UNITED STATES PATENT AND TRADEMARK OFFICE
CERTIFICATE OF CORRECTION

| | | |
|---|---|---|
| PATENT NO. | : 12,048,309 B2 | Page 1 of 1 |
| APPLICATION NO. | : 17/878517 | |
| DATED | : July 30, 2024 | |
| INVENTOR(S) | : Mark Gomelsky and Ahmed Elbakush | |

It is certified that error appears in the above-identified patent and that said Letters Patent is hereby corrected as shown below:

In the Claims

Column 17, Claim 20, Line 29, delete:
"The method of claim 1, wherein the contacting further"

And insert:
--The method of claim 14, wherein the contacting further--

Signed and Sealed this
Eleventh Day of February, 2025

Coke Morgan Stewart
*Acting Director of the United States Patent and Trademark Office*